INVENTOR
KEITH E. SOUTHWICK

BY Shoemaker and Mattare

ATTORNEYS

Aug. 22, 1967     K. E. SOUTHWICK     3,336,746
ENGINE AND METHOD OF PRODUCING POWER
Filed July 22, 1964     9 Sheets-Sheet 2

INVENTOR
KEITH E. SOUTHWICK

BY Shoemaker and Mattare
ATTORNEYS

Aug. 22, 1967  K. E. SOUTHWICK  3,336,746
ENGINE AND METHOD OF PRODUCING POWER
Filed July 22, 1964  9 Sheets-Sheet 3
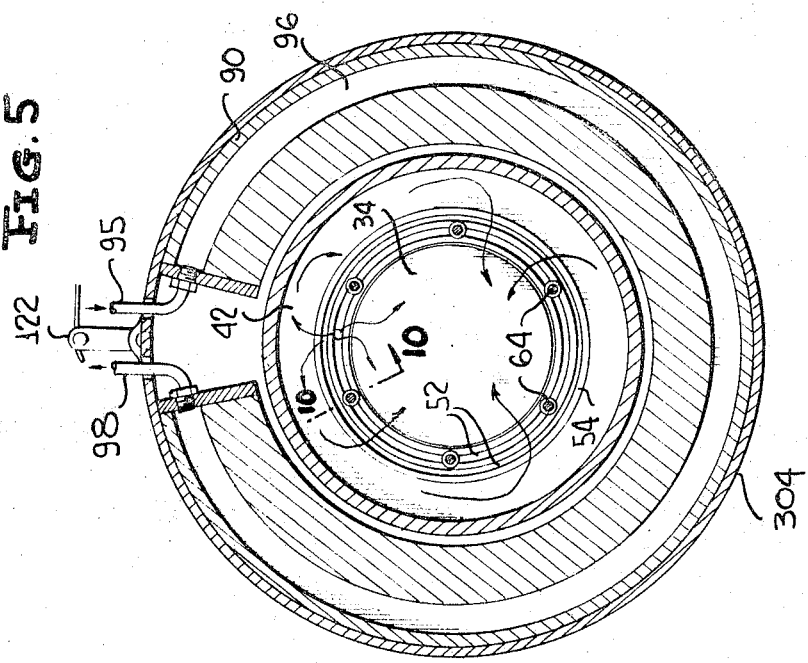
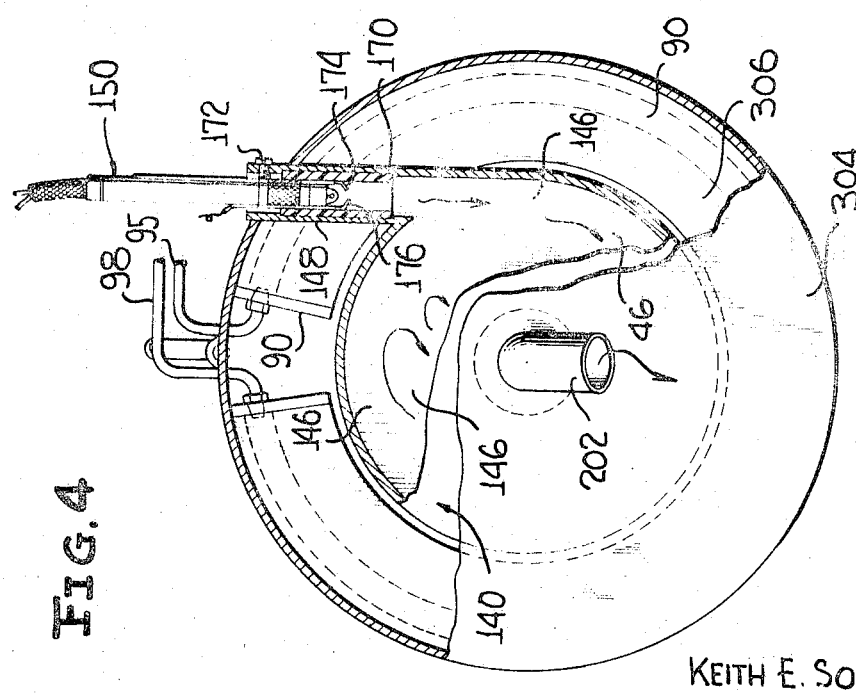
INVENTOR
KEITH E. SOUTHWICK
BY *Shoemaker and Mattare*
ATTORNEYS Aug. 22, 1967 K. E. SOUTHWICK 3,336,746
ENGINE AND METHOD OF PRODUCING POWER
Filed July 22, 1964 9 Sheets-Sheet 4
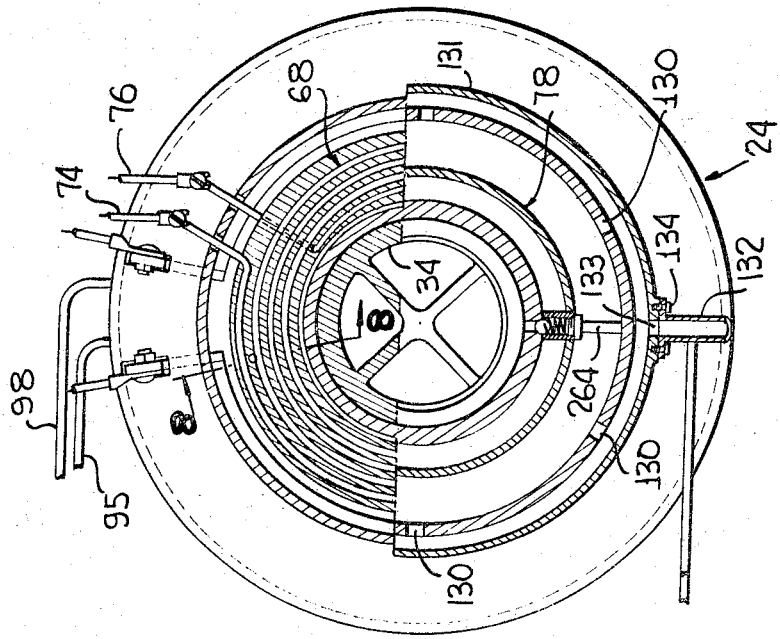
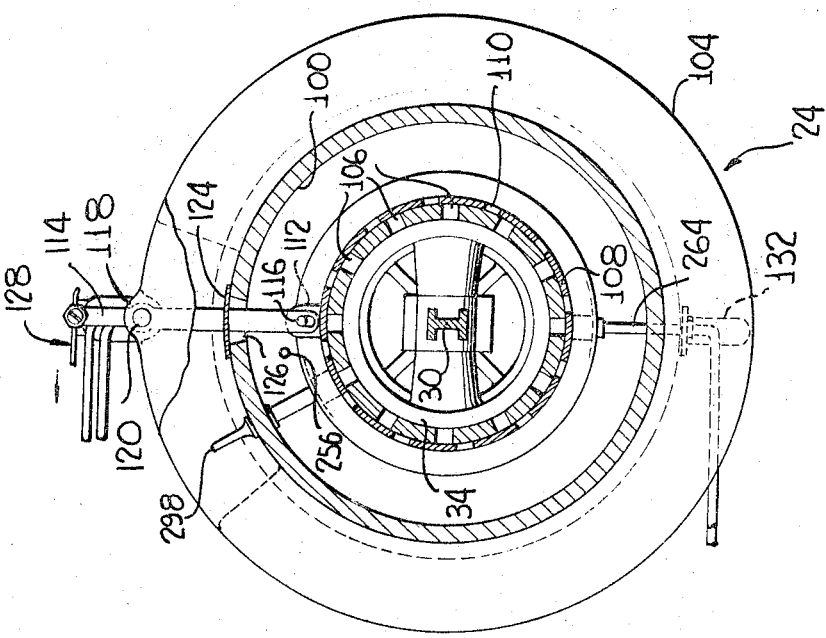
INVENTOR
KEITH E. SOUTHWICK
BY *Shoemaker and Mattare*
ATTORNEYS

INVENTOR
KEITH E. SOUTHWICK

BY *Shoemaker and Mattare*

ATTORNEYS

Aug. 22, 1967　　　　K. E. SOUTHWICK　　　　3,336,746
ENGINE AND METHOD OF PRODUCING POWER
Filed July 22, 1964　　　　　　　　　　　　　　9 Sheets-Sheet 6
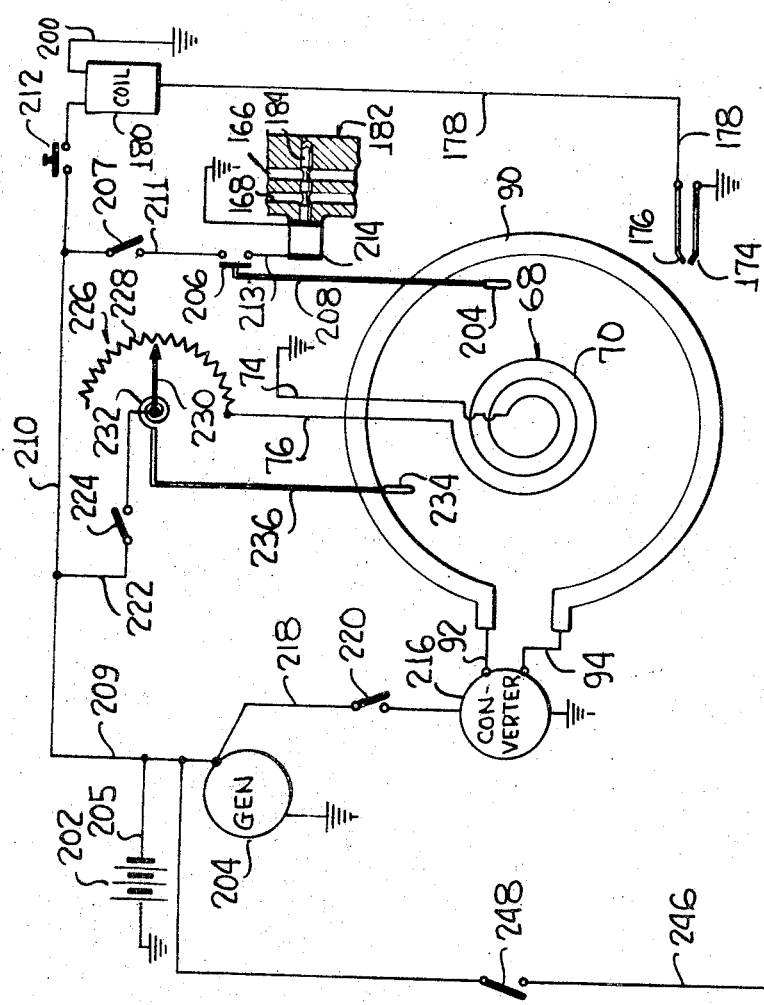
INVENTOR
KEITH E. SOUTHWICK
BY Shoemaker and Mattare
ATTORNEYS

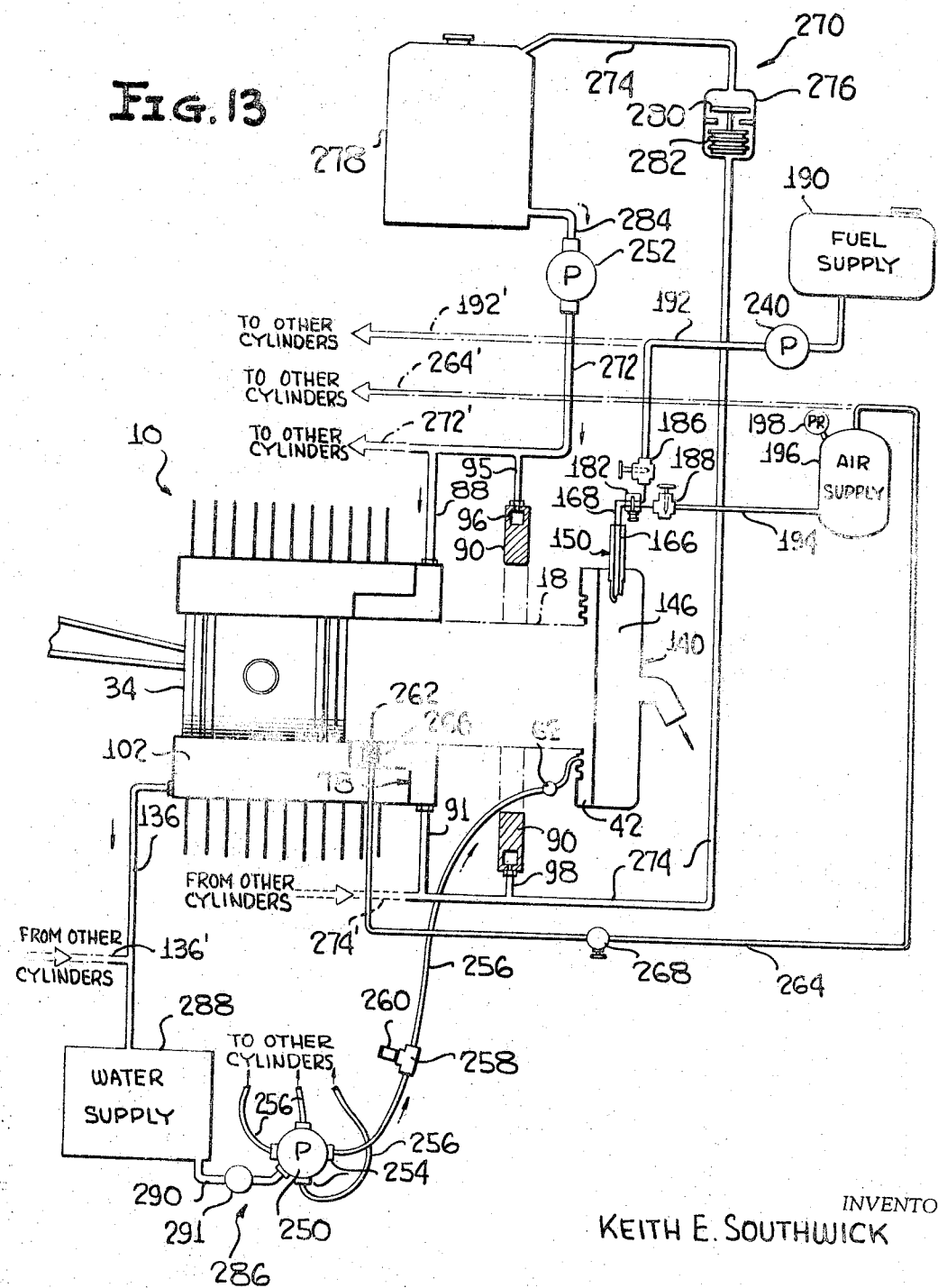

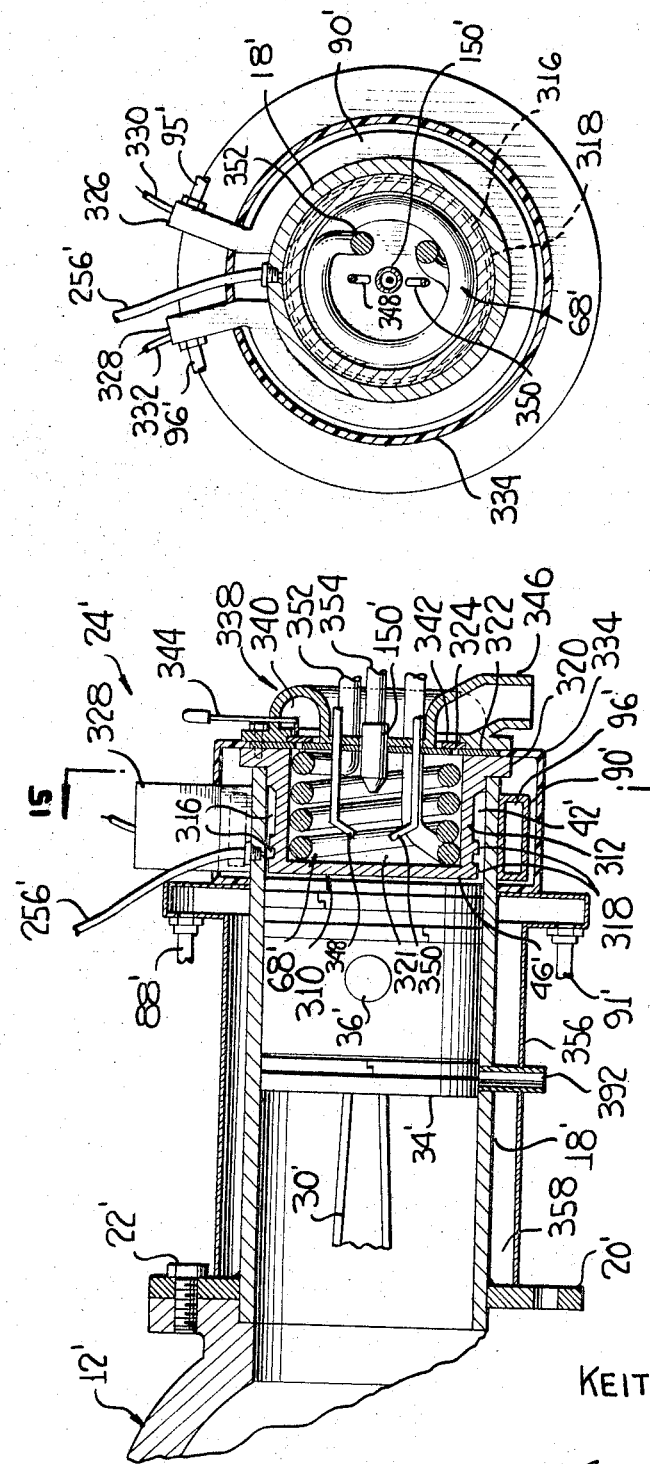

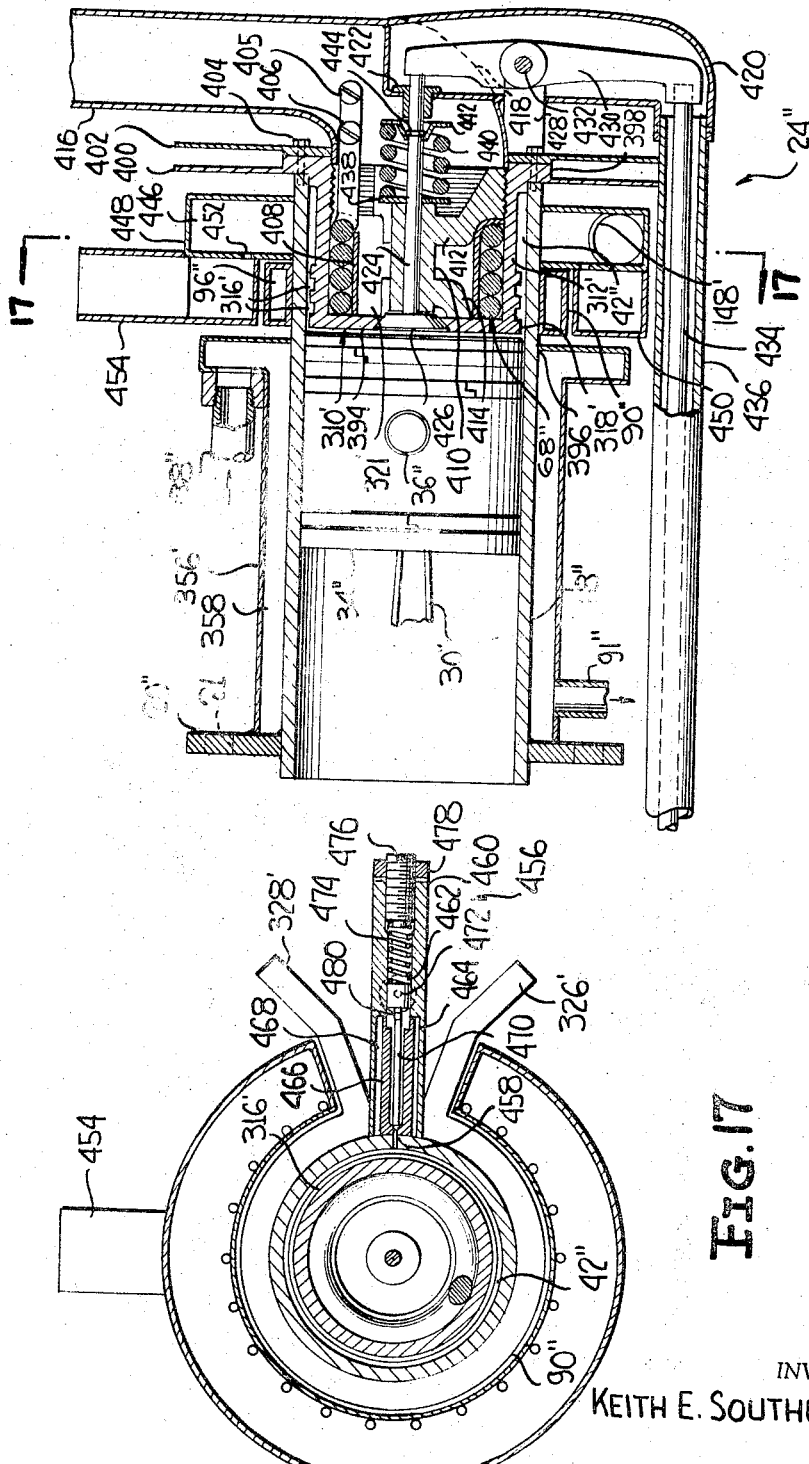

United States Patent Office 3,336,746
Patented Aug. 22, 1967

3,336,746
ENGINE AND METHOD OF PRODUCING POWER
Keith E. Southwick, R.R. 2, Geneseo, Ill. 61254
Filed July 22, 1964, Ser. No. 384,450
20 Claims. (Cl. 60—27)

This invention relates to a new engine and method for producing power, and more particularly to a compression reaction engine and method of producing power which utilizes water in a new and novel way.

Briefly, the engine comprises a reaction or compression chamber having a relatively small volume, means for heating the compression chamber to a relatively high temperature, mechanical means such as a cylinder and a reciprocating piston therein for compression a relatively large amount of gas into the compression chamber whereupon the temperature of the gas is greatly increased by the heat of compression and the heat transmitted thereto from the heated compression chamber, and means for injecting a predetermined quantity of water or other liquids into the compressed gases within the compression chamber whereupon the injected liquid is substantially instantly vaporized into steam by the heated gases in the compression chamber. When the injected liquid is converted into steam, the pressure within the compression chamber is greatly and rapidly increased. This increased pressure is applied to the piston so as to cause it to move thereby creating mechanical energy. The engine preferably also includes a conventional rotatable crank shaft having an eccentric connected to the piston by a connecting rod so that the linear movement of the piston may cause the crank shaft to rotate. Once the engine has been started, the means heating the compression chamber may be cut off or de-energized, and the engine will continue to operate from the heat of compression, that is, the heat caused and created by the piston compressing a relatively large volume of gas into the relatively small compression chamber. The compression chamber is so designed that the flow of the compressed gases therein to the piston will be restricted or retarded thereby permitting the gases to be gradually applied to the piston and move it throughout its stroke with a substantial constant force. The compression chamber preferably is formed by a plurality of circular and concentric grooves which provide a plurality of annular chambers, and these chambers are connected to each other by annular restricted passages or "squish" zones. Thus, when the engine is in operation, the compressed gases pass from one annular chamber or groove to another through the restricted annular passages thereby creating substantial turbulence which results in rapid transmission of heat from the walls of the compression chamber to the gases therein. The restricted passages also permit a steady and substantially even flow of pressure from the compression chamber to the piston so as to prevent knocking and so as to gradually apply power to the piston throughout its entire stroke.

It is the primary purpose and object of this invention to provide an engine which, after being heated by an external source and cranked by conventional means, such as an electric starter, then produces power by using water as the only fuel, the water being heated and converted into energy producing steam by heat produced by compressing gas within the engine.

It is another object of this invention to provide an engine which employs water as an energy producing means and is provided with a new and novel compression or reaction chamber.

It is yet another object of the invention to provide a new and novel process for producing energy wherein water is the principal energy producing medium.

Other objects and purposes of the invention are: to provide a compression reaction engine having a reaction chamber heated by a plurality of novel means such as a burner using combustible fuel, an electrical resistance heater, an induction heater operated by a high frequency alternating current, and an electrical arc heater; to provide an engine which includes means for building up and storing a supply of compressed air which is used for operating the burner which heats the engine and which may be also used for operating a motor for starting the engine; to provide novel insulation means for the reaction chamber of a compression reaction engine so that the engine may be properly operated in cold weather and with a maximum of efficiency; to provide novel means for throttling or controlling the power and speed of a compression reaction engine; to provide an engine which requires a minimum of air flow therethrough and whose moving parts are not exposed to a flame thereby insuring that the engine will have a very long life since its moving parts are not exposed to dirt, dust, particles produced by combustion and other foreign matter; to provide an engine which is composed of a minimum of parts and therefore is dependable in use, economical to manufacture and requires a minimum of maintenance; to provide an engine which is extremely versatile and may be used for any purpose which requires power; to provide an engine which operates on the two cycle principle so that each piston of the engine produces power on every down stroke; to provide automatic thermostatic control means for controlling the temperature of the compression chamber of a compression reaction engine; to provide novel means for heating water before it is injected into the compression chamber of a compression reaction engine and wherein this means is so designed that it functions to assist in condensing steam exhausted by the engine; to provide a compression reaction engine which may be selectively operated by the heat of compression only to vaporize water, or may selectively be used with external heating means whenever desired so as to increase the power output thereof or for starting purposes; to provide a compression reaction engine composed of a new and novel combination of materials; to provide a novel cylinder case for an engine which maintains the cylinder at a substantially constant and efficient operating temperature, which collects the cylinder exhaust so as to function as a muffler, and also functions to condense vapor exhausted from the cylinder; to provide a novel thermostatically controlled cooling system for a compression reaction engine; to provide a closed circuit for injecting water into each cylinder of a compression reaction engine wherein the circuit includes means for condensing the water vapor exhausted from the engine so that it may be recirculated through the system and used for an indefinite number of cycles; and to provide a plurality of means for heating each reaction chamber of each cylinder of a compressed reaction engine which are arranged so as to be extremely compact and so as to heat each reaction chamber with a maximum of efficiency.

The invention will be best understood from a consideration of the following detailed description taken in connection with the accompanying drawings, wherein:

FIGURE 4 is a vertical cross-sectional view taken substantially on the planes of line 4—4 in FIGURE 3;

FIGURE 5 is a vertical cross-sectional view taken substantially on the plane of line 5—5 of FIGURE 3;

FIGURE 6 is a vertical cross-sectional view taken substantially on the plane of line 6—6 of FIGURE 3;

FIGURE 7 is a vertical cross-sectional view taken substantially on the plane of line 7—7 of FIGURE 3;

FIGURE 11 is an enlarged view partially in section showing details of part of the means for supplying fuel and air to a burner for heating a compression chamber;

FIGURE 12 is a diagrammatic view showing control circuits and accessories for the engine comprising this invention;

FIGURE 13 is a diagrammatic view illustrating a cooling system and other details of the invention;

FIGURE 14 is a cross-sectional view through a cylinder of a modified form of the invention;

FIGURE 15 is a cross-sectional view taken substantially on the plane of line 15—15 of FIGURE 14;

FIGURE 16 is a cross-sectional view through the cylinder of another modified form of the invention; and FIGURE 17 is a cross-sectional view taken substantially on the plane of line 17—17 of FIGURE 16.

Figure 3:
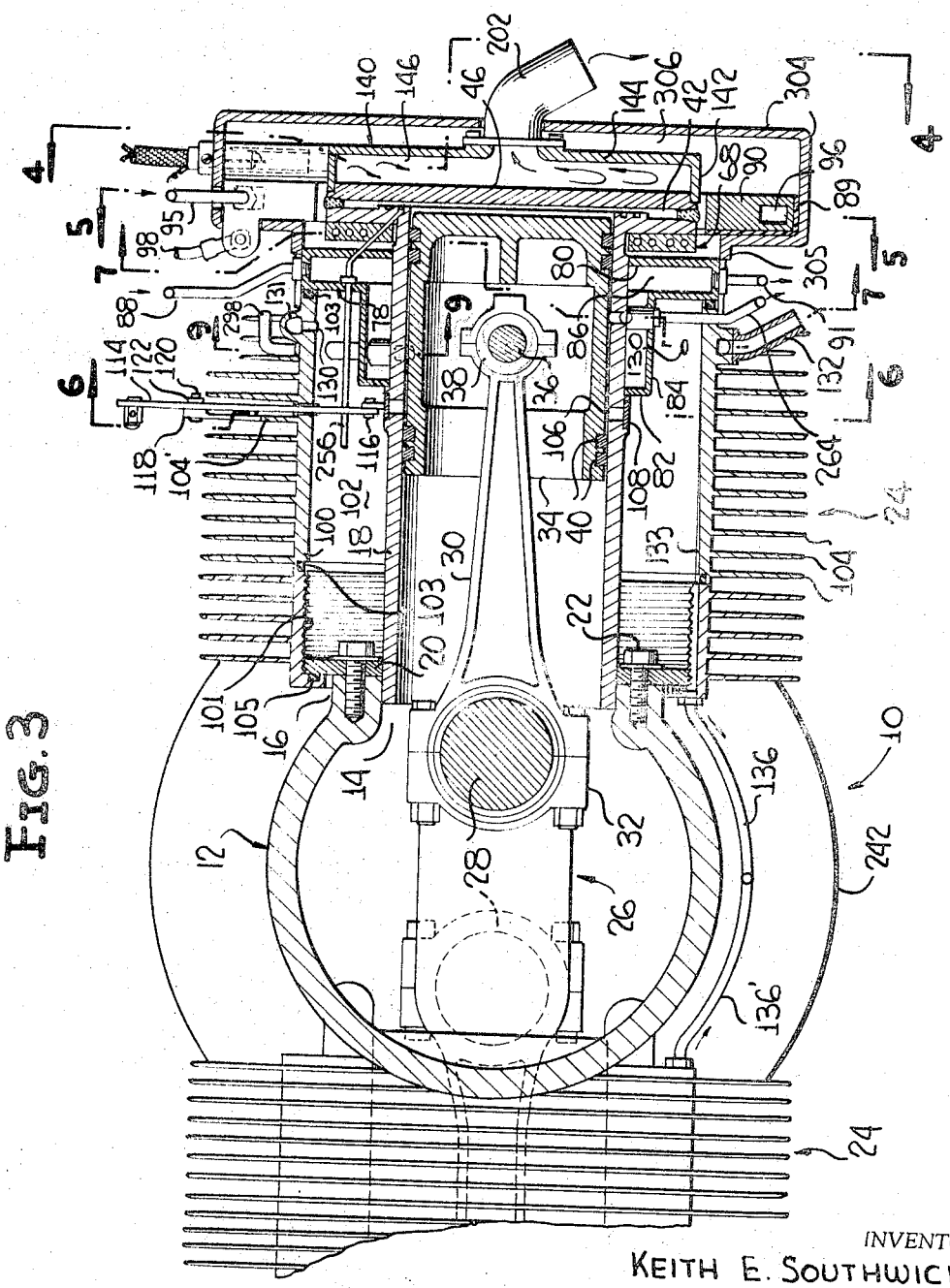
FIGURE 3 is an enlarged vertical cross-sectional view taken substantially upon the plane of line 3—3 of FIGURE 1 and showing details of one cylinder of the invention.

As illustrated in the drawings, the compression reaction engine 10 comprising this invention includes a generally cylindrical or tubular crank case 12 having a pair of circular openings 14 in each of its two opposite sides. The openings are defined by radially outwardly projecting annular flanges 16. A cylinder 18 is secured to each of the annular flanges 16. Each cylinder 18 has a flat mounting ring 20 extending around and secured to its inner end portion as by welding. The inner end of each cylinder telescopically fits within an annular flange 16 as shown in FIGURE 3 so that the mounting ring 20 of the cylinder abuts a flat outer surface of the flange. Each cylinder 18 is removably secured to the crank case by a plurality of threaded studs 22 which extend through peripherally spaced bores in the ring 20 and are threaded into an annular flange 16.

Figure 1:
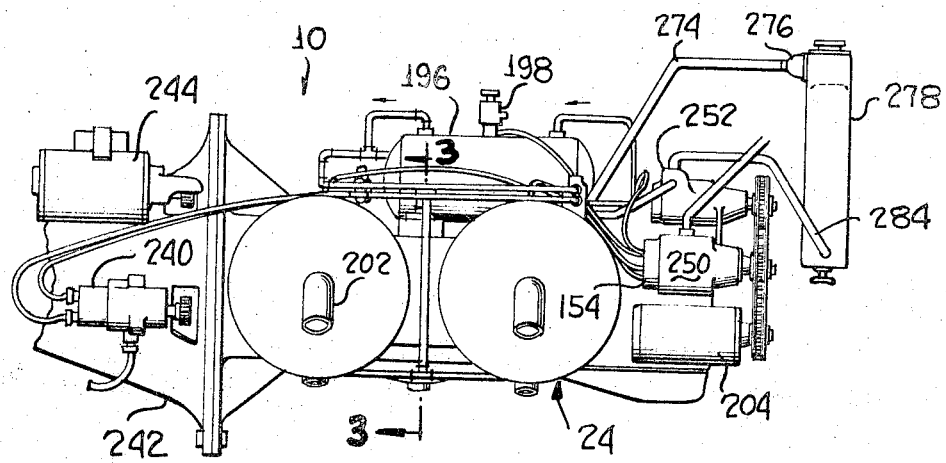
FIGURE 1 is a side elevational view of one form of the invention.
Figure 2:
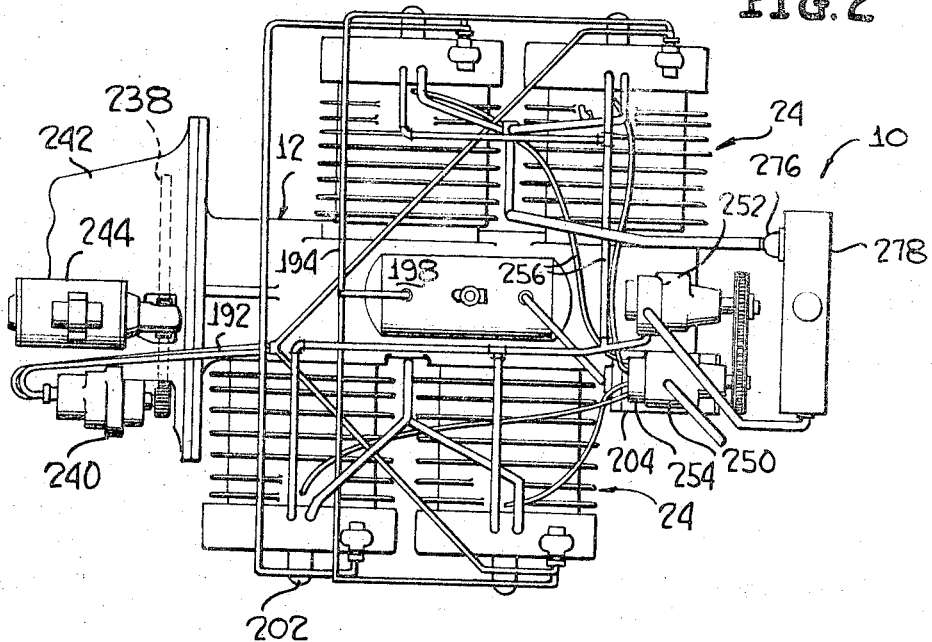
FIGURE 2 is a plan view of FIGURE 1.

Each cylinder 18 comprises a portion of a cylinder assembly 24 which totals 4 in number. As shown in FIGURES 1 and 2, a pair of cylinder assemblies 24 are secured on diametrically opposite sides of the crank case 12 so that all four of the cylinder assemblies lie in substantially the same horizontal plane thereby causing the engine 10 to be substantially flat and of a horizontally opposed type.

A crank shaft 26 extends axially through the crank case 12 and is rotatably journalled therein by conventional main bearings. The crank shaft 26 includes a plurality of cylindrical cranks 28 radially spaced from the axis of rotation of the crank shaft. A connecting rod 30 extends radially outwardly into each of the cylinders 18 and has its inner end rotatably journalled on one of the cranks 28 by a conventional bearing 32. A piston 34 preferably of hollow cylindrical construction is slidably mounted in each of the cylinders 18 and has a conventional wrist pin 36 extending diametrically across a central portion thereof. The upper end of each connecting rod 30 is pivotly connected to a wrist pin 36 by a conventional wrist pin bearing 38. Each piston is provided with a plurality of spaced peripheral grooves which contain conventional sealing or piston rings 40 for sealing the clearance between each piston and its respective cylinder.

Figure 8:
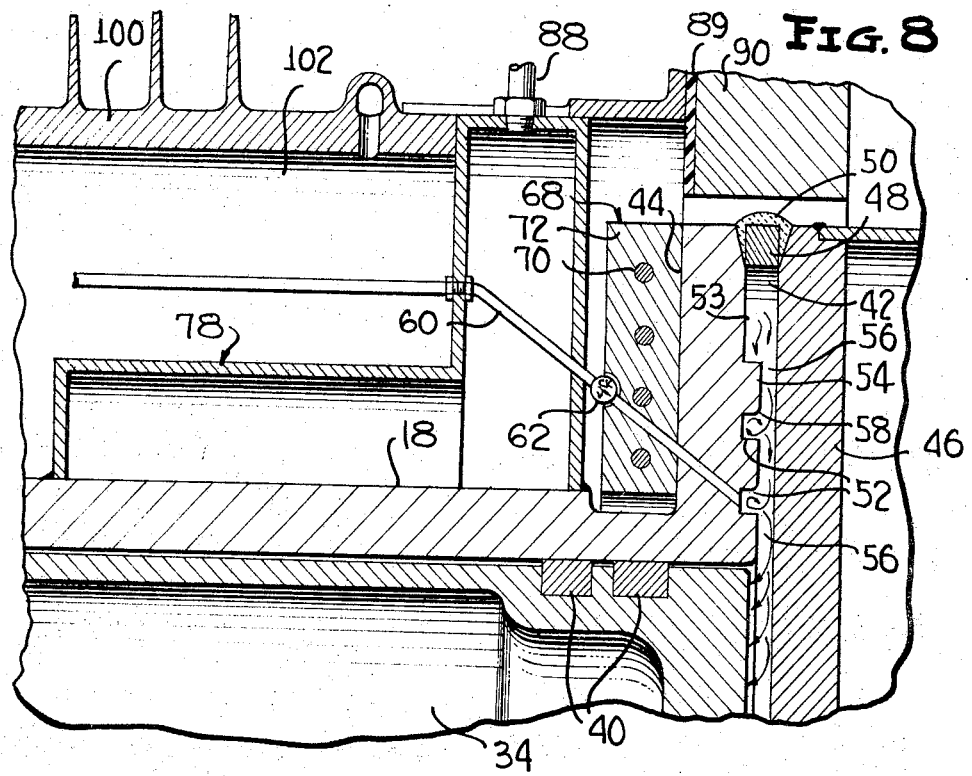
FIGURE 8 is an enlarged cross-sectional view taken substantially on the plane of line 8—8 of FIGURE 7.

The outer end of each cylinder communicates with and is connected to a compression or reaction chamber 42 which has a volume that is extremely small relative to the volume in the cylinder displaced by piston 34 when it moves through a complete cycle. Preferably, the volume of each compression chamber 42 is of such a size relative to the volume displacement of each piston so as to produce a compression ratio of at least 33 to 1 whereby a pressure of at least 500 pounds per square inch will be created within the compression chamber when the piston moves to the top of its stroke as illustrated in FIGURE 3 to compress a charge of atmosphere into the compression chamber which initially enters the cylinder at substantially atmospheric pressure. As shown in FIGURES 3, 5 and 8, compression chamber 42 is of annular shape and very narrow or thin in cross-section. The compression chamber is defined by an annular flange 44 secured to and projecting radially outwardly from the outer end of cylinder 18, a circular cylinder head 46 slightly spaced outwardly from flange 44 by a spacer ring 48 which is sealingly secured to flange 44 and head 46 by a peripheral weld 50. Each compression chamber 42 includes a plurality of spaced swirl or turbulence chambers 52 defined by a plurality of annular concentric grooves formed in flange 44 or head 56. The outermost turbulence chamber 53 may be larger in size than the chambers 52 as illustrated in FIGURE 8. Preferably, the turbulence chambers are rectangular in cross-section and are separated from one another by annular ribs 54. Each of the ribs 54 project towards the opposite side of the compression chamber and is separated therefrom by a very small clearance which defines a restriction or squish zone 56 which provides an annular restricted passage between each pair of adjacent swirl chambers. Preferably, each of the ribs 54 has its radially inner corner slightly rounded as indicated at 58. A high pressure conduit 60 is connected to each of the compression chambers for injecting liquid fuel therein, and preferably is connected to the radially innermost swirl chamber 52 as indicated in FIGURE 8. Each conduit 60 preferably contains a check valve 62 for preventing reverse flow through conduit 60 when extremely high pressures are produced within the compression chamber.

During operation of the engine 10, very high pressures are produced in compression chamber 42 which tend to cause outward bending or bulging of the central portion of cylinder head 46. To prevent outward bulging of the cylinder head, it is reinforced by a plurality of pins 64 circumferentially spaced around the axis of the compression chamber, and each pin extends through aligned bores in flange 44 and head 46. Each end of each pin is rigidly secured to the cylinder head and flange 44 by means of welds 66.

A plurality of means are provided for heating each of the combustion chambers 42, and one of these means comprises an electrical resistance heater 68 illustrated in FIGURES 3, 7 and 8, which comprises a coil of high resistance wire or cal rod 70 imbedded in an annular ring 72 of electrical insulation material having high heat transmission qualities. Ring 72 is secured to flange 44 so as to efficiently transmit heat from coil 70 to combustion chamber 42. As shown in FIGURE 7, the ends of the coil 70 project outwardly from the ring 72 and are connected to a source of electricity by wire conductors 74 and 76.

To control the temperature of each cylinder 18, and particularly to prevent it from overheating, the outer end thereof is surrounded with a water jacket 78 of annular construction. The water jacket comprises an outer wall 80 and an inner wall 82 of annular construction, each having their radially inner edges sealingly secured to the outer surface of cylinder 18 as by welding. The walls 80 and 82 are sealingly connected together by a Z-shaped outer wall 84 integrally secured to the outer edges of walls 80 and 82 so as to define an annular cooling chamber 86 of substantially L-shaped cross-section. The cooling or water jacket 78 is supplied with cooling liquids by an inlet conduit 88, and is exhausted by an outlet conduit 90. The cooling liquid within the cooling chamber 86 comes in direct contact with the outer surface of cylinder 18 so as to maintain it at a proper operating temperature, and particularly to prevent it from overheating during operation of the engine 10.

Each of the compression chambers of each cylinder may also be heated by an electrical induction heater 90 which, as illustrated in FIGURES 3 and 5, comprises a split ring of conductive material surrounding the periphery of a combustion chamber and has spaced ends connected to a source of high frequency alternating current by conductors 92 and 94. When high frequency alternating current is supplied to the heater 90, the current passing therethrough creates a magnetic field which induces eddy currents in the metallic material defining the compression chamber and thereby causing the temperature of this material to rapidly rise to a relatively high degree. To prevent the heater 90 from becoming too hot, it may be cooled by passing a cooling liquid through an annular passage 96 formed therein. One end of the heater 90 may be supplied with cooling liquid by a conduit 96 and cooling liquid may be exhausted from the other end of the heater by conduit 98. Although the heater 90 has been illustrated as comprising a split ring, it is to be understood that it may also consist of a plurality of concentric coils surrounding the compression chamber.

A condenser sleeve 100 concentrically surrounds each cylinder 18 in spaced relation thereto so as to define therewith an annular condenser chamber 102. Each sleeve 100 is provided with a plurality of peripheral and axially spaced cooling fins 104. An internally threaded condenser ring 101 is threaded onto the outer periphery of ring 20 so as to snugly force the outer end of sleeve 100 into abutting relationship with wall 84 of the water jacket 78. Opposite ends of sleeve 100 are provided with annular recesses, each of which contains a compressible annular sealing ring 103. The inner end of condenser sleeve 101 is provided with a flange which has an annular recess containing a sealing ring 105 which is normally forced into sealing engagement with the ring 20. In order to install and tighten the bolts 22, the ring 101 is threaded inwardly so as to provide an access opening between 101 and 100. After bolts 22 are installed, ring 101 is rotated on ring 20 to the position shown in FIGURE 3.

Cylinder 18 is provided at a central portion thereof with a plurality of peripherally spaced exhaust ports 106 which connects the interior of the cylinder to the condenser chamber 102 when piston 34 is at the bottom of its stroke or at its innermost position. As shown in FIGURES 3 and 6, each of the ports 106 communicate with a peripheral groove formed on the exterior surface of cylinder 18, and a valve ring 108 is rotatably journalled in the groove. Ring 108 is provided with a plurality of circumferentially spaced ports or openings 110 which are equal in number to and spaced the same as exhaust ports 106. Thus, ring 108 may be rotated on cylinder 18 so that openings 110 are aligned with ports 106 so that the ports are fully uncovered, or alternatively, the ring may be rotated so that openings 110 are out of alignment with ports 106 so that the ports may be fully or partially closed or throttled. Thus, ring 108 and ports 106 constitute an exhaust valve or throttle.

A lug 112 is secured to one side of the ring 108 and projects radially outwardly therefrom. An exhaust valve operating lever 114 projects radially outwardly from lug 112 and through an opening in sleeve 100. The inner end of lever 114 is pivotally connected to lug 112 by a pin 116 which is secured to the lug and extends through an elongated slot formed through the inner end of the lever. Fin 104' is provided with a radially outwardly projecting lug 118 through which extends a stud 120. The stud 120 also extends through a bore in a central portion of lever 114 so as to pivotly mount the lever on the stud and lug 118. A nut 122 is threaded on stud 120 so as to maintain the lever 114 closely adjacent the lug 118. An arcuate seal 124 is preferably secured to lever 114 so as to slide on the outer surface of sleeve 100 during pivotal movement of the lever and thereby seal opening 126 in the sleeve 100 and through which the lever extends. The outer end of each lever 114 of each of the four cylinders is connected by conventional means to a suitable operating linkage 128 which operates simultaneously and in unison all of the exhaust valve rings 108. Linkage 128 may be connected to a suitable manually operated control lever or to an automatic control mechanism.

The condenser chamber 102 is vented to the atmosphere by a vent passage 130 extending through the outer end of sleeve 100 and communicating with a vent pipe 132 secured to the outer surface of the sleeve as by studs 134.

As shown in FIGURE 3, any liquid in condenser chamber 102 is drained therefrom by a conduit 136 having one end threaded through an opening in a lower edge of ring 101 so as to communicate with a sloping drainage groove 138 formed in the lower interior surface of sleeve 100.

A fuel burner 140 is secured to each cylinder head 46 and constitutes an additional or alternative means for heating each compression chamber 42. Burner 140 comprises a burner housing comprising an annular wall 142 integrally secured at its outer edge to a substantially circular end plate 144. The inner edge of wall 142 is sealingly connected to cylinder head 146 as by welding. Walls 144 and 142 in conjunction with cylinder head 146 define a cylindrical combustion chamber 146. As shown in FIGURE 4, a cylindrical inlet sleeve 148 is integrally connected to burner housing so that the sleeve is tangent to the housing and communicates with combustion chamber 146. A fuel atomizer 150 telescopically fits within sleeve 148 so as to be axially slidable therein. Atomizer 150 comprises a tubular body 152 having its inner end threaded into the outer end of a substantially cylindrical head sleeve 154. The inner end of the head sleeve is chamfered or frusto conical as indicated at 156. A metallic nozzle body 158 is secured within the inner end portion of head sleeve 154 and is provided with an air jet 160 extending axially through substantially the center thereof. One side portion of body 158 projects inwardly beyond sleeve 154 and is formed with a fuel jet 162 which is inclined towards the axis of jet 160 so as to intersect same axially inwardly thereof as shown in FIGURE 11. A woven flexible metal tubular sheath 164 has one of its ends telescopically fitting within the outer end of body 152 and secured thereto. A flexible air or oxygen conduit 166 and a flexible fuel conduit 168 extend through sheath 164 and body 152, and the ends of these flexible conduits extend into passages formed in body 158 which communicates with nozzles 160 and 162. Body 152 and sleeve 154 are preferably formed of metal such as aluminum.

As shown in FIGURE 4, sleeve 148 is lined with an interior coating of heat resistant ceramic material 170 of tubular shape. Fuel atomizer 150 is axially slidable within the ceramic tube 170 and is adjustably secured in place by set screw 172 threaded through sleeve 148 and contacting the outer surface of atomizer 150 so as to lock it in place.

A fuel ignitor comprising a pair of spaced electrodes 174 and 176 is mounted on the atomizer 150 so that any spark jumping between the electrodes will ignite the atomized fuel mixture produced by the atomizer. The space between the ends of the electrodes is substantially in alignment with the air jet 160. The electrode 176 is secured to and grounded to the atomizer elements 154 and 152. The electrode 174 is electrically connected to a conductor which is insulated from and extends through an axial groove formed in the exterior surface of sleeve 154. This conductor 178 is connected to a source of extremely high voltage electricity such as a coil 180 shown in FIGURE 12.

FIGURES 11, 12 and 13 illustrate means for starting, operating and controlling each of the burners 140 and atomizers 150. The conduits 166 and 168 of each atomizer extend through a thermostatically controlled solenoid valve 182. Valve 182 includes a reciprocatable valve member 184 which is normally urged to an open position as illustrated in FIGURE 12 by spring means, not shown. The conduits 168 and 166 then extend from the valve 182 to manually adjustable needle valves 186 and 188, respectively. The inlet to needle valve 186 is connected to a source of fuel supply such as a tank 190 containing fuel oil. The inlet to needle valve 188 is connected by conduit 194 to a fuel oxidizer such as a tank 196 containing compressed air or oxygen, and preferably having a pressure relief valve 198.

As shown in FIGURE 12, coil 180 contains a primary coil unit, one end of which is ground by a conductor and the other end of which is connected to a source of direct current such as a battery 202 and generator 204 by conductors 206, 208 and 210, and manually operated switch 212. Coil 180 also contains a high voltage secondary coil unit one end of which is grounded by the conductor 200 and the other end of which is connected to the electrode 176 by conductor 178. Closing and opening of switch 212 energizes and de-energizes coil 180 so as to cause a high voltage spark to jump across a gap between electrodes 174 and 176 and thereby ignite the atomized fuel air mixture produced by the atomizer 150 adjacent the electrodes. Conductor 178 may be connected in parallel to the electrodes 176 of all the cylinders. The burners 140 are initially started by manually opening the needle valves 186 and 188 so that fuel and air may flow through the jets 160 and 162 respectively of each atomizer 150. As shown in FIGURE 11, the stream of air ejected from jet 160 passes over jet 162 at a relatively high velocity thereby causing a decrease in pressure so that fuel is sucked out of jet 162 and into the path of the air stream produced by jet 160. Since the jet of air produced by jet 160 is moving at a very high velocity, when this jet of air strikes the stream of fuel flowing from jet 162, the fuel is broken into finely divided particles so as to become thoroughly mixed with the air steam. As explained above, this fuel air mixture is initially ignited by depression of switch 212. Once the fuel air mixture has been ignited, needle valves 186 and 188 are regulated so as to produce a proper fuel air ratio and thereby cause the fuel to be burned with maximum efficiency. Needle valves may also be regulated to control the size of the flame produced by the atomizer. As shown in FIGURE 4, the air stream produced by jet 160 moves in a direction tangent to the circular combustion chamber 146 so that the fuel air mixture is swirled around the axis of the combustion chamber so as to produce efficient burning and efficient heating of the entire cylinder head 46 which forms one wall of the combustion chamber. The exhaust produced after complete burning of the fuel is exhausted through a central exhaust opening in the end plate 144, and the exhaust gases then pass through an exhaust pipe 202 secured to the end plate and in communication with the central opening therethrough.

FIGURE 12 illustrates automatic means for regulating the temperature produced by each burner. A bulb 204 containing heat expansible fluid such as mercury is located in or adjacent to each combustion chamber 146 and is operatively connected to a fluid pressure operated switch 206 by conduit 208. When the temperature of the cylinder head or the combustion chamber 146 exceeds a predetermined level, the liquid in bulb 204 expands and thereby causes switch 206 to close thereby causing current to flow through conductors 205, 209, 210, 211, switch 206 and conductor 213 so as to energize solenoid 214 which moves the valve member 184 to a partially closed position thereby reducing the flow of air and fuel through the conduits 168 and 166. This decreases the amount of heat produced in each combustion chamber 146 and thereby lowers the temperature of cylinder head 46. As soon as the temperature of the cylinder head drops below a predetermined level, switch 206 opens thereby de-energizing solenoid 214 to permit valve member 184 to return to the open position illustrated in FIGURE 12.

As shown in FIGURE 12, the electrical induction heater 90 receives its energy from a source of direct current such as battery 202 or generator 204 which are connected to a converter 216 by conductors 205, 209, 218 and a control switch 220. The converter 216 is capable of converting direct current into high frequency alternating current and may comprise a direct current motor driving a high frequency alternating current generator, for example. When switch 220 is closed, converter 216 supplies high frequency alternating current to the ring or coil comprising heater 90 thereby inducing heat into the cylinder head and compression chamber which is surrounded by the heater.

The coil 70 comprising the resistance heater 68 has one of its ends grounded by a conductor 74 and its other end connected to the battery 202 or generator 204 by conductors 205, 209, 210, 222, switch 224, rheostat 226 and conductor 76. Rheostat 226 includes an arcuate resistor 228 and a brush 230 having one of its ends slidably contacting the resistor 228 and its other end secured to the one end of a spiral Bourdon tube 232, the other end of the Bourdon tube 232 is connected to a bulb 234 by means of a conduit 236. Bulb 234, conduit 236 and tube 232 are filled with a heat expansible fluid such as mercury, and the bulb is located in or adjacent to cylinder head 46 and heater 90 so that when the temperature of heater and cylinder head reach a predetermined level, the fluid in the bulb expands thereby causing the tube 232 to uncoil thereby pivoting brush 230 in a counterclockwise direction as viewed in FIGURE 12 so as to reduce the current supplied to coil 70. When the heater 90 and cylinder head surrounded thereby decrease in temperature, below a predetermined level, coil 232 moves brush 230 in a clockwise direction so as to supply more current to coil 70 and thereby increase its heat producing capacity. Thus, automatic means are provided for controlling coil 70 so that it will maintain its associated cylinder head and compression chamber at a predetermined optimum temperature.

As illustrated in FIGURES 1 and 2, engine 10 is preferably provided with a fly wheel 238 secured to one end of its crank shaft 26 and the fly wheel has peripheral gear teeth driving a fuel pump 240. Fuel pump 240 is mounted on a fly wheel housing 242.

An electric starter 244 is also mounted on fly wheel housing 242 and comprises an electric motor drivingly connected to a spur gear automatically engageable with the gear teeth on fly wheel 238 so that the starter automatically rotates the fly wheel when energized. As shown in FIGURE 12, the starter 244 is connected to battery 202 by conductors 246, 209 and 205, and starter switch 248.

As illustrated in FIGURES 1 and 2, a high pressure water or fuel pump 250 and a coolant pump 252 are mounted on one end of the engine 10 adjacent the generator 204. Pumps 252 and 250 and generator 204 each have drive shafts secured to sprockets in alignment with a sprocket secured to one end of crank shaft 26, and a chain 252 surrounds all the sprockets so that the crank shaft may positively drive the pumps and generator. Pump 250 is drivingly connected to a water distributor 254 which in turn is connected to each compression chamber 42 by high pressure conduit or pipe 256. As shown in FIGURE 3, each pipe 256 preferably extends through a condenser chamber 102, water jacket 78, flange 44 and terminates within the smallest or radially innermost groove 52 of the compression chamber. Preferably, each pipe 256 contains in series therewith a check valve closely adjacent a compression chamber so as to permit water to flow from pump 250 to the compression chamber but does not permit pressure in the compression chamber to cause reverse flow through the pipe and check valve. Preferably, each pipe 256 also contains in series therewith a throttle valve 258 which is operated by and remotely controlled by a solenoid 260. Preferably, each of the solenoids 260 are connected to a single control means so that all of the valves may be simultaneously controlled from a remote point so as to control the rate and volume of flow per unit time through each of the pipes 56.

During starting and operation of the engine 10, piston 34 creates high pressure within cylinder 18 during its compression stroke. This may be utilized for charging tank 196 by providing a port 262 through at least one of the cylinders 18 and connecting this port to tank 196 by a pressure conduit 264 as illustrated in FIGURE 13. Preferably, port 262 is located a substantial distance from piston 34 when it is at the bottom of its exhaust stroke so that when the piston moves towards its compression chamber, gases compressed by the piston within the cylinder are forced through conduit 264 into the supply tank 196. Port 262 is preferably provided with a check valve 266 so as to prevent pressure from escaping from the tank 196. An automatic pressure control valve 268 is preferably connected in series with conduit 264 so that after the air pressure in tank 196 and conduit 264 has reached a predetermined level, valve 268 will automatically close and prevent further increase of pressure within the tank. Valve 268 may also be provided with a manual control means for selectively closing conduit 264 whenever desired. A cooling circuit 270 is schematically illustrated in FIGURE 13 for maintaining the cylinders and induction heaters 90 of engine 10 at a proper operating temperature.

Liquid coolant such as water is forced through the cooling circuit 270 illustrated in FIGURE 13 by the power driven pump 252. Pump 252 forces the coolant into one end of passage 96 in the heater 90 and into one side of the cooling jacket 78 of each cylinder by conduits 272, 88 and 95. The coolant circulates through the heater 90 and the water jacket 78, and is exhausted therefrom by means of conduits 98 and 91, respectively. Conduits 91 and 98 convey the coolant into conduit 274 which conducts the coolant to the inlet of a radiator 278 by means of thermostat 276 connected in series with the conduit 274. Thermostat 276 is of conventional design and may comprise a normally closed valve member 280 which is opened by an expansible bellows 282 when the temperature of the coolant has reached a predetermined level so that the thermostat maintains the coolant at a predetermined proper temperature. The coolant passes through the radiator 278 wherein it is properly cooled and then returned to pump 252 by means of conduit 284. As indicated in FIGURE 13 in dotted lines, the water jackets and induction heaters of the remaining cylinders are cooled in an identical manner as the cylinder illustrated in FIGURE 13 by extensions 272′ and 274′ of the conduits 272 and 274, respectively.

The water supply and circulating system 286 for injecting water at the proper time and in the proper amount into the compression or reaction chambers 42 is illustrated schematically in FIGURE 13 and includes a source of water supply such as a tank 288 filled with water. The tank 288 supplies water to the inlet of high pressure pump 250 by means of conduit 290. The pump forces the water under extremely high pressure to the distributor 254 which is drivingly connected to the pump so as to successively supply a small quantity of water under high pressure to each of the conduits 256. When the water is supplied to one of the conduits 256 by the distributor, it flows through the restrictor valve 258, check valve 262, and is injected into a compression chamber 42 under high pressure and in proper timed relation to the movement of piston 34. Preferably, the water is injected into the compression chamber just before the piston reaches the top of its compression stroke so that the water is rapidly vaporized by the heat of the gases in the compression chamber which is at a relatively high temperature due to the extremely high compression thereof by the piston and due to the heat transmitted thereto from the cylinder head. As the water is vaporized, it forms steam which increases the compression or pressures within the compression chamber thereby driving piston 34 away from the cylinder head with great force. Preferably, the injection of water continues through into the compression chamber through at least a substantial portion of the power of the power stroke of the piston so that substantially constant pressure is applied to the piston. At the bottom or end of the power stroke, the piston uncovers exhaust ports 106 in the cylinder wall so that the vaporized water or steam is exhausted into condensation chamber 102 whereupon the steam is cooled and condensed by sleeve 100 which is maintained at a relatively cool temperature by fins 104. The condensed steam forms water which flows out of the condensation chamber by means of groove 138 and conduit 136 whereupon it is returned to tank 288 to be used again. Check valve 62 prevents pressure in the compression chamber from forcing water towards distributor 254, and the solenoid operated restrictor valve 258 in each pipe 256 may be remotely controlled to regulate the amount of water injected into each compression chamber so as to control the power and speed of the engine. Distributor 254 may be automatically or manually controlled to regulate the amount of water flowing therethrough and to vary its timing in relation to pistons 34.

Figure 9:
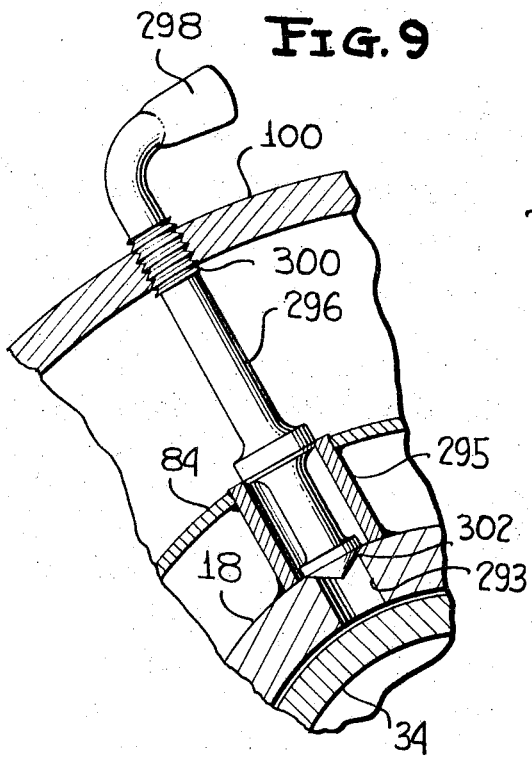
FIGURE 9 is an enlarged cross-sectional view taken substantially on the plane of line 9—9 of FIGURE 3.
Figure 10:
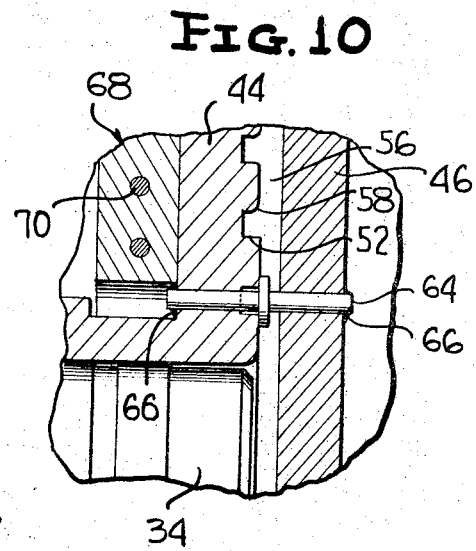
FIGURE 10 is an enlarged cross-sectional view taken substantially on the plane of line 10—10 of FIGURE 5.

A bleed port 293 is provided through cylinder wall 18 between exhaust ports 103 and compression chamber 42 as shown in FIGURES 3 and 9. Preferably, the bleed port is located closely adjacent the compression chamber. A sleeve 295 is welded between cylinder wall 18 and water jacket wall 84 substantially concentric with port 293, and the outer end of the sleeve communicates with the condenser chamber 102 so as to connect this chamber to port 293. A valve stem 296 extends radially outwardly from port 293, through sleeve 100, and its outer end is connected to an operating handle 298. Stem 296 is provided with threads 300 which mate with threads in the opening through sleeve 100 through which the valve stem extends. The radially inner end of the valve stem is connected to a conical valve member 302 which normally is seated in the outer end of port 293 so as to seal same. By rotating the valve stem 296 by means of handle 298, the valve member 302 may be forced into sealing engagement with the outer end of port 293 or the valve member may be moved radially outwardly so as to open the port.

The conduits 192′, 264,′ 272′, 274′, and 136′ are connected to the other three cylinders in a manner the same as or similar to the lines 192, 264, 272, 274 and 136 are connected to the cylinder 18 illustrated in FIGURE 13.

The conduit 290 may contain in series therewith a centrifugal separator 291 so as to separate any oil or other foreign substances in the water which is supplied from tank 288 to pump 250.

As illustrated in FIGURE 3, a cylindrical hollow housing 304 encloses cylinder head 46, fuel burner 140, induction heater 90, compression chamber 42 and resistance heater 68, and is provided with a flanged opening 305 which is connected to the sleeve 100 or the cooling jacket 78. The space 306 between the walls of housing 304 and heater 140, heater 90 and heater 68 is preferably filled with an insulating material so as to prevent loss of heat from the heaters and the cylinder head of the engine, thereby causing the engine to operate with maximum efficiency. The bearings and moving parts of the engine 10 are lubricated by conventional means such as a splash or pressure oil system.

To start and operate the engine 10, levers 114 are operated so as to rotate the valve rings 108 to open positions. Bleeder valves 302 are operated to closed position by handles 298 so as to close ports 293. The handles 298 may be connected to a common operator so that they may all be operated simultaneously. The starter switch 248 is then closed so as to energize the starter 244 so that it rotates crank shaft 26 and causes the pistons 34 to reciprocate in their respective cylinders. When the piston 34 illustrated in FIGURE 3 moves outwardly on its compression stroke, it compresses air within the cylinder thereby causing check valve 262 to open so that tank 96 is supplied with compressed air through conduit 264. After the air tank is sufficiently charged with compressed air, the starter switch is opened so as to de-energize the starter. The bleed valves 298 are opened and the solenoid valves 182 are opened by opening the switches 207 (see FIGURE 12) so that fuel and compressed air are supplied to the nozzles or jets 162 and 160 of the atomizers 150. The thoroughly vaporized or atomized fuel air mixture in the burners 140 is then ignited by depressing and releasing switch 212 so as to cause a spark or a series of sparks across the spaced electrodes 174 and 176 in each burner. Switch 212 may be continuously opened and closed by a motor or vibrator so as to cause a continuous series of sparks across the spaced electrodes 174 and 176. Once the burners are started, the proper fuel air ratio is obtained by adjusting the needle valves 188 and 186. The burners 140 cause the cylinders to rapidly be heated to operating temperature. To further speed up the heating process, either or both of the heaters 90 and 68 may be used with the burners. Referring to FIGURE 12, the induction heater 90 may be energized merely by closing switch 220 so as to supply high frequency current to the heater, and the resistance heater 68 for each cylinder may be energized by closing switches 224. For starting and operating the engine, the heaters 68, 90 and 140 may be used alone or in any combination. The burners 182 and resistance heaters 68 are automatically maintained at proper operating temperatures by thermostatic valve 82 and thermostatically controlled rheostat 226, respectively. Suitable thermostatic control means may also be provided for regulating the heating capacity of the induction heater 90 of each cylinder.

After the cylinder heads and compression chambers of each cylinder have been properly heated, starter switch 248 is again closed as to energize the starter 244 and cause it to reciprocate the pistons in the cylinders. Since the bleed ports 293 are opened, very little compression is created in the cylinders so that the starter may rotate the crank shaft relatively fast with a minimum of resistance. Valves 258 are simultaneously opened by controlling solenoids 260 so that a small quantity of water is injected into each compression chamber substantially at the top of each compression stroke and bleed ports 293 are closed by simultaneously pivoting the valve handles 298. On the upstroke of each piston, air in its respective cylinder is compressed into a compression chamber 42. When the piston nears the top of its compression stroke, the distributor 254 injects a jet or stream of water into the radially innermost groove 52 so that the water strikes the cylinder head 46 at high velocity and breaks up into small particles or droplets. At the same time, water is rapidly heated and the gases being compressed into the compression chamber force the water droplets and vapor radially outwardly towards the periphery of the compression chamber where it is further heated by the heat of compression and the heat supplied to the walls of the compression chamber. The compressed gases and water move with extremely high velocity through the restricted annular spaces 56, and as they pass into the next adjacent turbulence chamber or groove, the compressed gases and water are swirled about and subjected to high turbulence as indicated by the arrows in FIGURE 8. This forcing of the gases and water through the restricted spaces and swirling them in the turbulence chambers not only breaks the water particles up into finer particles, but also creates friction which further heats the gases and water particles. This causes the water particles to more rapidly become heated and vaporized into steam. Also, it brings substantially all of the water particles into contact with the hot surfaces forming the compression chamber so that heat is more rapidly and efficiently transmitted to the water particles from the surfaces defining the compression chamber. When the piston in each cylinder reaches the top of its compression stroke as illustrated in FIGURE 8, the gases compressed within the compression chamber have been greatly elevated in temperature by the heat of compression and substantially all of the water injected into the compression chamber has been converted into superheated steam which further greatly increases the pressure within the compression chamber so as to force the piston downward on its power stroke with enormous force.

Preferably, the water injection into the compression chamber continues during the initial part of the power stroke so that more steam is generated thereby maintaining the pressure in the compression chamber and cylinder substantially constant as the piston moves downwardly. This prevents knocking and causes the piston to be pushed downwardly with a substantially even and constant force throughout its power stroke. When the piston begins to move downward or inwardly on its power stroke, the gases within the compression chamber begin to move radially inwardly towards the piston as indicated by the arrows in FIGURE 8 thereby creating further swirling and turbulence in the turbulence chambers 52 so that the gases and water which is continued to be injected into the compression chamber are further heated and expanded for increasing the pressure. The restricted annular spaces or squish zones 56 restrict the flow of steam and pressurized gas towards the piston so that pressure is evenly and constantly applied to the piston. Of course, as the pistons are forced inwardly towards the crank shaft 26, they rotatably drive the crank shaft through their respective connecting rods 30.

When a piston reaches the bottom of its power stroke, it uncovers the exhaust ports 106 thereby permitting substantially all of the pressurized gases within the cylinder to flow through the exhaust ports into a condensation chamber 102. As the piston moves upwardly again on its next compression stroke, it compresses the gases remaining in the cylinder and the above described cycle is repeated. Since each piston has one compression and one power stroke during each revolution of the crank shaft 26, it can be seen that the engine 10 operates on the two cycle principle, thereby causing it to produce much more and even power for its size and weight relative to the conventional four cycle engines now in use.

Once the engine has been started, as explained above, any one of, any two of, or all of the heaters 140, 90 and 68 may be cut off or de-energized, and the engine will continue to operate because the heat produced by compressing gases within the compression chambers will be sufficient to convert the injected water into steam, and this steam will force the pistons inwardly during their power strokes with much more force than is required for compression. Of course, whenever an increase of power or additional power is needed, it is only necessary to restart the burners 140 or re-energize one or both of the heaters 90 and 68.

When the engine is initially started, additional gas pressure may be supplied to the tank 196 by means of check valve 262, however, once the pressure in tank 196 reaches a predetermined level, valve 268 will automatically close thereby preventing further pumping of gases through conduit 264.

Once the engine has been started, its speed and power may be controlled by several means, such as by rotating the exhaust rings 108 so as to vary the effective openings of the exhaust ports 106, by controlling solenoids 260 to regulate the amount of water flowing through the valves 258, by regulating the timing of the distributor 254 and by controlling or cutting off and on the heaters 70, 90 and 140.

It is to be noted that when steam is exhausted through the exhaust ports 106 of a cylinder, it comes in contact with the relatively cool surface of sleeve 100 and is thereby condensed into water which is returned to the water or fuel tank 288 by means of groove 138, and conduit 136. In this manner, the same water is used over and over again, and since the water exhausted from the condenser chambers 102 is relatively hot, it is more readily vaporized when re-injected into the compression chambers thereby increasing the efficiency of the engine. Any excess pressure which builds up in a condenser chamber 102 is relieved by exhaust vent passage 130 and vent pipe 132.

As illustrated in FIGURE 3, each water injector pipe 156 passes through a condenser chamber 102 and through a cooling jacket 78 so that the pipe is heated by the exhaust gases in the condenser chamber and by the liquid coolant in the water jacket which is at a relatively high temperature such as 180 to 200° F. Thus, the water in pipe 256 is heated to a high temperature before it is injected into the compression chamber thereby causing it to be vaporized more rapidly and causing the steam in the compression chamber to have a higher temperature so as to further increase the pressure in the compression chamber and the power output of the engine.

In order to simplify the engine and to decrease the cost of manufacture thereof, any one or any two of the heaters 68, 90 and 140 may be omitted. When the engine is supplied with all three heaters, they may be used alone or in any combination.

During operation of each burner 140, its atomizer 150 may be adjusted axially within sleeve 148 by loosening screw 172 so as to properly locate the flame produced by the atomizer within chamber 156. By having the atomizer located and arranged as shown in FIGURE 4, it is not exposed to the heat of its flame, and the flame produced thereby is projected over the circular cylinder head so as to effectively heat same.

As shown in FIGURES 3 and 7, the vent or exhaust passages 130 in sleeve 100 are circumferentially spaced around the sleeve and exhausts into a circular manifold 131 formed around the periphery of sleeve 100. The manifold 131 exhausts into the vent or exhause pipe 132 by means of a passage 133. The passages 130 and 133, manifold 131 and pipe 132 effectively vent the condenser chamber 102 to prevent pressure from rising therein, and this structure in conjunction with the condenser chamber 102 functions as a muffler to substantially eliminate any exhaust noise of the engine 10. Although most of the steam exhausted from each cylinder 10 is condensed in a condenser chamber 102, some of the steam may be exhausted through pipe 132.

During operation of the engine, its parts are effectively cooled and maintained at an efficient operating temperature by the cooling system 270 shown in FIGURES 1, 2 and 13.

During operation of the engine 10, its electric heaters are normally supplied with electric energy from the generator 204, but where the engine is mounted in a fixed position, it may be supplied with an outside or separate source of electrical energy.

Although the engine 10 is illustrated as having four cylinder assemblies 24, it is to be understood that the principles of this invention may be employed in a one cylinder engine, or an engine having any number of desired cylinders. The stroke and bore of each cylinder assembly may be varied as desired, and the compression ratio of each cylinder assembly may be changed to meet the power and other design requirements of the engine.

Instead of having a single injector pump and distributor for the engine 10 as illustrated in FIGURE 13, the compression chamber of each cylinder may be provided with a separate high pressure injector which may be manually or automatically controlled for changing its timing of injection and the quantity of water injected thereby.

A modified form of cylinder assembly 24' is illustrated in FIGURES 14 and 15. It includes a tubular cylinder 18' secured at its inner end to a radial flange 20' which in turn is movably connected to crank case 12' by bolts 22'. A piston 34' is reciprocated within the cylinder 18' by a connecting rod 30' pivotly connected to the piston by a wrist pin 36' at one end and pivotly connected to the crank of a crank shaft at its other end. The outer end of the cylinder 18' is closed by a cylindrical cup shaped cylinder head 310 which includes a circular head plate 46' integrally secured to a cylindrical wall 312. The wall 312 telescopically fits within the outer end of the cylinder and the inner portion thereof is reduced in diameter so as to be spaced from the cylinder 18' and thereby form a compression chamber 42'. The compression chamber is also defined by a plurality of annular grooves in wall 312 as indicated at 316 and which form circular ribs 318. The grooves 316 define axially spaced concentric annular turbulence chambers which are connected by annular restricted passage ways defined between the ribs 318 and the inner surfaces of cylinder 18'. The outer end of head 310 has an integral radially outwardly extending flange 320 which extends over the cylinder 18' and is secured thereto as by bolts, not shown. Head 310 surrounds and defines a heating chamber 322, one end of which is closed by a circular plate 322 having an annular row of exhaust ports 324 therethrough.

An inductor ring or coil 90' encircles the outer end of cylinder 18' in radial alignment and closely adjacent to combustion chamber 42'. A layer of electrical insulating material such as the insulating layer 89 shown in FIGURES 3 and 8 may be provided between the heater 90' and the cylinder 18'. The induction heater or ring 90' is provided with spaced ends 326 and 328 which project radially outwardly and are connected to a source of high frequency alternating current by conductors 330 and 332. The heater 90' is provided with a cooling passage 96' which extends throughout the length thereof, and the ends of which are connected to a coolant inlet pipe 95' and a coolant outlet pipe 96' so that a liquid coolant such as water may be circulated through the heater.

An annular housing 334 composed of heat insulating material surrounds the induction heater 90'. The housing is U-shaped in cross-section and includes a pair of parallel annular flanges, one of which overlaps the outer end of flange 320 and abuts the outer periphery of plate 322. The other flange projects radially inwardly and abuts the outer periphery of cylinder 18'. The radially extending ends 326 and 328 of heater 90' project outwardly through apertures in housing 334.

A circular exhaust manifold 338 is bolted to the flange 320 of cylinder head 310 so as to clamp plate 322 and an edge of housing 334 between the manifold and the outer end of the cylinder head. The manifold is formed with an annular exhaust passage 340 therethrough which is U-shaped in cross-section and normally communicates with the annular row of exhaust ports 324. An annular flat exhaust valve ring 342 is rotatably mounted on plate 322, and the outer peripheral edge of the ring extends into a groove formed in the exhaust manifold so that the ring is maintained in position to overlie the exhaust ports 324. A valve operating handle 344 is secured to the ring 342 and projects radially outwardly through a slot in manifold 338. An annular row of exhaust ports, not shown, are provided through the ring 342 and are normally in alignment with the ports 324. However, by rotating ring 342 by means of handle 344, the ports 324 may be mis-aligned with the ports in the valve ring so as to partially or completely close the ports 324. The passage 340 is vented to atmosphere by an exhaust pipe 346 formed integral with the exhaust manifold. A fuel atomizer 150' which may be similar in structure to the atomizer 150 shown in FIGURE 11 projects axially through the center of manifold 338 and plate 322 so as to extend into chamber 321.

A pair of spaced electrodes 348 and 350 are mounted in the center of chamber 321 so that the space between the electrodes is in alignment with the atomizer 150'. The electrodes 348 and 350 are connected to a suitable source of electricity so that an extremely hot and continuous arc may be produced therebetween for raising the temperature of the cylinder head to a high level. The electrodes may also be energized momentarily for creating a spark to ignite fuel injected into the chamber by the atomizer 150'.

An electrical resistance heater 68' comprising a spiral coil of cal rod or high resistance wire is concentrically mounted in chamber 321 closely adjacent the compressor chamber 42'. The ends of the spiral wire comprising heater 68' are formed into axially outwardly projecting members 352 and 354 which project outwardly through plate 322 and manifold 338, and are connected to a suitable source of electricity for causing the heater 68' to heat the cylinder head and compression chamber 42'.

A cylindrical water jacket 356 surrounds a major portion of cylinder 18' in spaced relation thereto so as to provide a space 358 for the flow of coolant therethrough. The water jacket is supplied with water by a conduit 88' which circulates through the jacket and is exhausted into a conduit 91'.

The central portion of the cylinder 18' is provided with one or more exhaust ports which are uncovered by the piston at the bottom of the stroke and which are vented to atmosphere by one or more exhaust pipes 392.

The compression chamber 42' has water injected thereinto substantially at the top of the compression stroke or the piston 34' by means of a high pressure conduit 256' which enters the compression chamber adjacent the groove 316 nearest piston 34'.

Another modified form of cylinder assembly 24" is illustrated in FIGURES 16 and 17, and differs primarily from the form shown in FIGURES 14 and 15 by having a mechanically operated exhaust valve.

The assembly 24" includes a cylinder 18" welded to an annular flange or ring 20" having a peripheral row of bores 21 therethrough for receiving bolts to secure the cylinder assembly to a crank case.

A piston 34" is reciprocated in the cylinder by means of a connecting rod 30" connected at one end to the cylinder by a wrist pin 36" and connected at its other end to a conventional crank shaft. A cylindrical cup-shaped cylinder head 310' similar to the cylinder head 310 in FIGURE 14 telescopically fits into the outer end of cylinder 18" and includes a tubular wall 312' having a portion of its outer surface removed so as to define with the cylinder wall 18" a compression chamber 42" similar to the compression chamber 42' of FIGURE 14 and including annular turbulence chambers 316' spaced by circular ribs 318'. The inner end of the cylinder head 310' is closed by an integral circular wall 394 so that the cylinder head 310' encloses a heating chamber 321' of cylindrical shape which is open only at its outer end. The innermost rib 318' preferably has a plurality of weld spots 396 applied thereto in circumferentially spaced relation and machined so as to snugly fit the inner surface of cylinder 18' so as to concentrically center the cylinder heat 310' about the axis of cylinder 18". If desired, similar weld spots may be employed on the cylinder heads 310 of FIGURE 14 in a similar manner. Wall 312' has a radial flange 398 integrally secured to its outer end so as to project over the outer end of cylinder 18". Flange 398 preferably includes an integral radially projecting cooling fin 400. A separate cooling fin 402 abuts the flange 398, and cylinder head bolts 404 extend through aligned bores in the fin 402 and flange 398 and are threaded into the outer end of cylinder 18" so as to removably secure the fin 402 and cylinder head 310' to the cylinder.

An electrical resistance heater 68" similar to the heater 68' of FIGURE 14 and comprising a coil of high resistance electrical wire or rod is concentrically located within the chamber 321' so as to be closely adjacent the inner surface of the wall 312'. The ends 404 and 406 project out of the cylinder assembly 24" and are connected to a source of electricity for energizing the heater 68". The coils of the heater are enclosed between cylinder head 310' and an annular cover 408.

A valve guide sleeve 410 has an outer end integrally secured to three radially projecting ribs 412 having outer surfaces threaded into the outer end of wall 312' so as to support the sleeve 410 in the center of heating chamber 321'. A plurality of circumferentially spaced abutment ribs 414 are secured to the inner end of sleeve 410, and these ribs project radially outwardly and axially inwardly so as to contact a surface of circular wall 394 and limit the inward movement of sleeve 410 when ribs 412 are threaded into the wall 312'. As shown in FIGURE 16, the ribs 412 have arcuate surface which contact the outer end of cover 408 so as to secure it in position.

An exhaust pipe 416 has an enlarged curved end 418 which extends into the chamber 321' and preferably is secured to the fin 402 as by welding. A rocker arm housing 420 has one end extending into the curved end 418 and secured thereto. A valve guide bushing 422 is mounted in a wall of housing 420 so as to be in axial alignment with sleeve 410. A valve stem 424 is slidably mounted in sleeve 410 and bushing 422, and has its inner end integrally secured to a frusto-conical valve head 426 which seats in an opening through circular wall 394 of the cylinder head. A valve rocker support arm 428 is secured to the fin 402 and projects outwardly and into the rocker arm housing 420. A conventional rocker arm 430 has a central portion thereof pivotally mounted on the outer end of support arm 428 by means of a pivot pin 432 and conventional needle bearings, not shown. One end of the rocker arm 430 abuts the outer end of the valve stem 424, and the other end of the rocker arm is provided with a recess which receives the outer end of a push rod 434 which is operated by a conventional cam mechanism driven in timed relationship to a rotatable crank shaft. The push rod 434 is enclosed by a push rod housing 436 of tubular construction which has its inner end secured to the crank case of the engine and its outer end telescopically fitting within a flanged opening in the housing 420.

The outer end of the valve stem 424, extends through a washer 438, a valve spring 440 and a valve keeper 442 which is removably secured to the valve stem by a resilient snap or split ring 444 which fits within an annular groove in the valve stem. A frusto conical portion of the keeper 442 encircles ring 444 and the keeper is thereby prevented from moving axially outwardly on stem 424. If desired, tapered split valve keepers may be mounted within a groove in the valve stem instead of the split ring 444. Spring 440 is compressed between washer 438 and keeper 442 so as to urge the valve stem outwardly and normally maintain valve 426 in a position to close the opening through wall 394.

An electrical inductance heater 90" similar to the heater 90' of FIGURE 14 surrounds the cylinder 18' and compression chamber 42', and has ends 326' and 328' connected to a source of high frequency alternating current so that the compression chamber may be heated selectively by electrical induction. A cooling passage 96" extends through the heater 90", and the ends of this passage are connected to inlet and outlet conduits of a cooling system.

A circular fuel burner chamber 446 surrounds the compression chamber 42" and is enclosed by an annular burner housing 448 of U-shaped cross-section and a portion of the cylinder 18" to which the housing is secured. However, as shown in FIGURE 17, a portion of housing 448 is removed so as to provide a passage for the ends 326' and 328' of the induction heater. A circular exhaust manifold 450 is secured to the inner wall of the housing 448, and the chamber 446 of the housing is connected to the interior of the manifold 450 by an arcuate row of exhaust ports 452 extending through the inner wall of the burner housing 448. The manifold 450 substantially surrounds cylinder 18" and induction heater 90", but has spaced ends to provide a space for the projecting ends 326' and 328' of the induction heater 90". The exhaust manifold is vented by burner exhaust pipe 454 which projects outwardly of the manifold 450.

A cooling jacket 356' surrounds the cylinder 18" in spaced relation thereto so as to define therewith a peripheral cooling chamber 358. The cooling jacket 356' is connected to an inlet conduit 88" and an outlet conduit 91" of a cooling circuit.

The burner housing 448 has connected thereto an inlet sleeve 148' similar to the sleeve 148 shown in FIGURE 4 and which contains a fuel atomizer such as the atomizer 150 shown in FIGURE 4 and a suitable electrical igniter such as shown in FIGURE 4.

The innermost groove or turbulence chamber 316 is connected to a water injection means 456 by means of a port 458 which extends through the cylinder 18" and communicates with the innermost groove 316'.

The water injector means 456 includes an elongated injector housing 460 having a central passage 462 therethrough, and a portion 464 thereof being enlarged and containing therein a valve sleeve 466. The valve sleeve 466 has an axial passage therethrough communicating with the passage 462 and the port 458. The outer periphery of sleeve 466 is spaced from bore 464 so as to define an annular cooling chamber 468. Cooling chamber 468 is preferably connected to conduits 88" and 91" so as to proivde a flow of coolant therethrough for cooling the injector means.

A needle valve 470 extends axially through the passage in valve sleeve 466 and has its inner end tapered so as to sealingly fit a tapered valve seat in the inner end of sleeve 466 and thereby close port 458. The outer end of needle valve 470 extends into passage 462 and is connected to a valve piston 372 slidable within passage 462. An inlet passage is provided through housing 460 so as to extend into passage 462 between piston 472 and the inner tapered end of needle valve 470. A coil spring 474 is compressed between the piston 472 and a stud 476 threaded into the outer end of passage 462 so that the spring urges the tapered end of needle valve 470 into sealing engagement with the valve seat in the inner end of sleeve 466. A lock nut 478 is threaded onto the outer end of stud 476 so as to lock it in adjusted position.

Normally, spring 474 urges needle valve 470 into sealing relation with the valve seat in the inner end of sleeve 466 so as to close port 458. However, when water is injected under high pressure from an injection pump into passage 464 by means of inlet port 468, the pressure of the injected water acts against the inner face of piston 472 so as to urge it outwardly and thereby compress spring 474 and open the inlet port 458 so that water under high pressure may be injected into the compression chamber 42".

The cylinders 24' of FIGURE 14 and 24" of FIGURE 16 may each be connected to a conventional crank case and crank shaft in any desired number and arrangement to form an engine having any desirable number of cylinders arranged in any desired manner. For example, each of the cylinders may be connected to a crank case and crank shaft in the manner illustrated in FIGURES 1 and 2 to form a 4-cylinder horizontally opposed engine, or only one of each cylinder may be connected to a crank case and crank shaft to form a single cylinder engine.

The fuel burner atomizer 150' of FIGURE 14 and the fuel burner atomizer used in the cylinder assembly 24' of FIGURE 16 may each be connected to a fuel supply system and controlled by valve means as shown in FIGURE 13 for the atomizer 150. The water injector conduit 256' of the cylinder assembly 24' and the water injector port 480 of the cylinder assembly 24" may each be supplied with water under pressure by the water supply circuit 286 illustrated in FIGURE 13 so that a small quantity of water is injected into each compression chamber near the top of each compression stroke. The engine exhaust pipes 392 and 416 may each be connected to a steam condenser so that the water vaporized in each engine may be condensed and re-used. The cooling jacket conduits 88' and 91', the inductor ring conduits 95' and 96' of the cylinder assembly 24', and the cooling jacket conduits 88" and 91", the cooling passage 96" of the induction heater 90" and the cooling chamber 468 of the cylinder assembly 24" may each be connected to a cooling circuit similar to the cooling circuit 270 shown in FIGURE 13.

The resistance heater 68', the induction heater 90', and the fuel burner 150' of the cylinder assembly 24' of FIGURE 14, and the resistance heater 68", the induction heater 90", and the fuel burner used in the cylinder assembly 24" of FIGURE 16 may each be connected to and controlled by the systems shown diagrammatically in FIGURE 12.

Thus, each of the cylinder assemblies 24' and 24" operate on the two-cycle principle and substantially in the same manner as cylinder assembly 24' of FIGURE 3. Turbulence is created in each of the compression chambers 42' and 42" in substantially the same manner as the compression chamber 42 during compression and expansion of the gases into and out of the compression chambers. However, since the compression chambers 42' and 42" extend axially instead of radially and are formed in part by part of the cylinder wall itself, a more compacted and simplified structure is produced.

Each of the heating means in any of the cylinder assemblies may be used alone, all at the same time, or in any combination. Also, as explained above, once the cylinder assemblies have become properly heated after the engine has been started, all the external heating means may be shut off and the cylinder assemblies will operate by heat of compression alone.

The cylinder assembly 24' shown in FIGURE 14 is provided with a fourth heating means comprising the electrical arc electrodes 348 and 350 in addition to the induction heater 390', the resistance heater 68' and the gas burner supplied with fuel by the atomizer 150'. Similar electric arc means may be mounted in the chamber 146 of cylinder assembly 24 and chamber 321 of cylinder assembly 24" so as to provide additional means for heating the cylinder assemblies. During operation of the atomizer 150' in the cylinder assembly 24' of FIGURE 14, the exhaust ports 324 are opened by rotating ring 342 by means of handle 344 so as to align the openings in the ring with the openings 324 so that exhaust gases produced by burning of fuel in the chamber 321 may be exhausted through ports 324, exhaust manifold 338 and exhaust pipe 346.

During operation of the cylinder assembly 24", the exhaust valve 426 is opened at or just before the bottom of each power stroke by means of push rod 434, rocker arm 430 and conventional cam means, not shown, operating the push rod. The valve is closed by spring 440 at the bottom of the power stroke or after the piston 34" has moved outwardly a small fraction of its compression stroke. The exhaust valve preferably remains open long enough so that the pressure in cylinder 18' between the piston and the cylinder head will decrease to substantially atmospheric pressure. After the valve closes, the gases remaining within the cylinder are highly compressed into compression or reaction chamber 42" so that the volume thereof is reduced many times and the temperature thereof is greatly increased so that when the water is injected through port 458 into the compression chamber, it is rapidly vaporized into steam to drive the piston downwardly again on a power stroke.

When the exhaust valve 426 is open, the exhaust gases pass into the chamber 321', between the ribs 412 and 414, through the exhaust pipe 416 and are preferably conducted to a condensing means so that the steam in the exhaust gases may be condensed. The exhaust gases flowing over the cylinder head and heater cover 408 function to maintain the cylinder head at a high temperature as well as to convey heat to the resistance heater 68", thus causing the engine to operate more efficiently.

The various parts of the engine comprising this invention are preferably composed of: crank shaft of steel or steel alloy; connecting rods of steel, steel alloy, aluminum or aluminum alloy; cylinders of stainless steel or other steel alloys; compression chamber of heat resistant steel alloys; crank case of aluminum or aluminum alloys; and induction heater ring of copper or brass.

Other novel means may be employed for heating the compression or reaction chamber of each cylinder assembly such as atomic energy means, means for magnifying the rays of the sun onto the cylinder assembly, and means for converting radio waves into heat. The latter three means are particularly useful when the invention is used in space.

In order to insure that each cylinder of the engine receives the same amount of injected water, the pump 250 may be replaced by a positive displacement pump having a pumping chamber and a reciprocating plunger means therein for positively forcing water from the chamber. The positive displacement pump is connected to a water tank by means of a low pressure pump which draws water from the water supply and forces it through an adjustable throttle under low pressure to the intake of the positive displacement pump. Excess water delivered by the low pressure pump is bypassed by a pressure relief valve to the water supply. The high pressure pump is provided with a suitable distribution means so as to supply an equal quantity of water to each cylinder at the proper time.

It is to be noted that the sleeve 100 in conjunction with the ring 101 produce several new and improved functions and results. First, they form a chamber 102 which acts as a muffler to muffle the exhaust noise from cylinder 18, and they provide a chamber around the cylinder which prevents entry of foreign matter into the cylinder ports. Secondly, they act as a condensing means to condense most, if not all, of the vaporized liquids which are exhausted from each cylinder. Thirdly, they function as insulating means to insulate each cylinder from outside temperature variation, such as cold air, or an aircraft engine. Thus, the cylinders are maintained at a substantially constant temperature regardless of the environment in which they function.

In order that the sleeve 100 and ring 101 may function more efficiently as a condensing means, they are preferably provided with radially projecting internal fins integrally secured thereto. These fins are similar to the fins 104 except they are smaller in radial thickness.

Normally, all the vaporized liquids exhausted into the chamber 102 will not be fully condensed into a liquid or liquids. For this reason, it is desirable that the non-condensed vapors and gases exhausted through pipe 132 be conducted to a secondary condenser where they are completely condensed into a liquid or liquids. In this manner, all the vapors exhausted from the engine cylinders are condensed in the chambers 102 and the secondary condensers.

Inasmuch as various changes may be made in the form, location and relative arrangement of the several parts without departing from the essential characteristics of the invention, it will be understood that the invention is not to be limited except by the scope of the appended claims.

I claim:

1. A cylinder assembly for a compression reaction engine comprising a hollow cylinder having an inner end and an outer end, means on the inner end of the cylinder for connecting it to a crank case, a cylinder head structure including an annular flange secured to the outer end of the cylinder and projecting radially outwardly therefrom, a circular cylinder head spaced outwardly from said flange, means sealingly connecting said cylinder head to the outer periphery of said disc, a circular cylinder head sealingly connected to the outer periphery of said flange, said flange, cylinder head and sealing means defining an annular compression chamber in communication with the interior of said cylinder and said compression chamber being relatively thin in cross section, a water injection conduit extending through said cylinder head structure and communicating with said compression chamber, water injection means connected to said conduit for injecting water into said compression chamber, an electrical resistance heater surrounding the outer end of said cylinder and located closely adjacent said annular flange so as to efficiently heat said compression chamber, an annular electrical induction heater encircling said cylinder head structure closely adjacent the outer periphery thereof, a hollow burner housing secured to said cylinder head, said cylinder head and burner housing defining a cylindrical burner chamber having exhaust port means for venting the chamber, injector means connected to said burner housing for injecting a combustible mixture of fuel and air into said burner combustion chamber, a piston slidable within said cylinder and mechanical means connecting said piston to power output means.

2. A compression reaction engine including a cylinder having an inner and an outer end and defining a chamber therewithin, a piston slidably mounted in said chamber within the cylinder for reciprocatory movement toward and away from said outer end of the cylinder, means defining a compression chamber adjacent said outer end of the cylinder, said compression chamber being in communication with the outer end of said chamber within the cylinder, said compression chamber being of generally annular configuration, said compression chamber including a plurality of annular concentric turbulence chambers, means defining an annular restricted passage between adjacent turbulence chambers and also between one of said turbulence chambers and the outer end of the adjacent chamber in said cylinder, means for injecting liquid into said compression chamber, exhaust means for exhausting said chamber in the cylinder after said piston has moved a predetermined distance from said compression chamber, and heating means adjacent said means defining the compression chamber for heating said compression chamber.

3. A compression reaction engine including a cylinder having an inner and an outer end and defining a chamber therewithin, a piston slidably mounted in said chamber within the cylinder for reciprocatory movement toward and away from said outer end of the cylinder, means including a pair of spaced surfaces defining a compression chamber adjacent said outer end of the cylinder, said compression chamber being in communication with the outer end of the chamber within said cylinder, said compression chamber being of generally annular configuration, said compression chamber including a plurality of annular concentric turbulence chambers, said turbulence chambers being formed between spaced annular ribs, each of said ribs projecting from one of said surfaces toward the other of said surfaces and being separated from such other surface by a relatively small clearance to define an annular restricted passage between adjacent turbulence chambers and also between one of said turbulence chambers and the outer end of the adjacent chamber in said cylinder, means for injecting liquid into said compression chamber, exhaust means for exhausting said chamber in the cylinder after said piston has moved a predetermined distance from said compression chamber, and heating means adjacent at least one of said surfaces defining the compression chamber for heating said compression chamber.

4. Apparatus as defined in claim 3 wherein each of said turbulence chambers and each of said restricted passages is substantially rectangular in cross section.

5. Apparatus as defined in claim 3 wherein said liquid injecting means is connected to said one turbulence chamber.

6. Apparatus as defined in claim 3 including a member having thereon one of said surfaces, said heating means being positioned to apply heat directly to said member to heat said member and the associated surface to thereby heat said compression chamber.

7. Apparatus as defined in claim 2 wherein said turbulence chambers and said restricted passages lie in a plane extending substantially normally to the axis of said cylinder.

8. Apparatus as defined in claim 7 including a condenser housing surrounding said cylinder and exhaust means so as to define a condenser chamber between said condenser housing and said cylinder, cooling means connected to said condenser housing and return conduit means connected between said condenser chamber and said liquid injector means so that water condensed in said condenser chamber may be again injected into said compression chamber.

9. Apparatus as defined in claim 7 including a condenser housing surrounding said cylinder and exhaust means so as to define a condenser chamber between said condenser housing and said cylinder, cooling means connected to said condenser housing, return conduit means connected between said condenser chamber and said water injector means so that water condensed in said condenser chamber may be again injected into said compression chamber, and adjustable valve means on said cylinder for selectively adjusting the effective size of said exhaust means.

10. Apparatus as defined in claim 9 wherein said exhaust means comprises an annular row of exhaust ports formed through said cylinder, said adjustable valve means comprising a valve ring rotatable about said cylinder and having an annular row of valve ports therethrough adapted to be selectively aligned and misaligned with said row of exhaust ports.

11. Apparatus as defined in claim 8 wherein said condenser housing has a plurality of vent ports formed therethrough for venting said condenser chamber to atmosphere.

12. Apparatus as defined in claim 8 including a water supply tank and centrifugal separator means connected in series with said return conduit means.

13. Apparatus as defined in claim 2 wherein said turbulence chambers and said restricted passages have substantially the same outer diameter and are axially spaced relative to the axis of said cylinder and are concentric thereabout.

14. Apparatus as defined in claim 13 including a generally cylindrical cylinder head telescopically fitted within and spaced from said first-mentioned cylinder to define an annular space therebetween comprising said compression chamber, said annular space being closed at the outer end of said cylinder.

15. Apparatus as defined in claim 14 wherein said cylinder head is generally cup-shaped to define a heating chamber therewithin closed off by a plate having exhaust port means formed therethrough.

16. Apparatus as defined in claim 15 including a valve means movably mounted adjacent said plate and having exhaust port means formed therein adapted to be aligned or misaligned with the exhaust port means in said plate to open or close said exhaust port means as desired.

17. Apparatus as defined in claim 13 including a generally cylindrical cylinder head telescopically disposed within the outer end of said cylinder and spaced therefrom to define an annular space which forms said compression chamber, the inner end of said cylinder head including a wall having a hole formed therethrough, said cylinder head defining a chamber therewithin, said chamber being in communication with an exhaust pipe, and movable valve means for closing said hole.

18. Apparatus as defined in claim 17 including resilient means normally biasing said valve member to its closed position to close off said hole, and means for selectively opening said valve means.

19. Apparatus as defined in claim 17 wherein said heating means is disposed within the chamber in said cylinder head and in surrounding relationship to said valve means.

20. Apparatus as defined in claim 19 including additional heating means disposed in closely surrounding relationship to the outer end of said cylinder.

References Cited

UNITED STATES PATENTS

| | | | |
|---|---|---|---|
| 1,195,639 | 8/1916 | Auble | 60—27 |
| 1,309,102 | 7/1919 | Rector | 60—27 |
| 1,636,887 | 7/1927 | Windell | 60—27 |
| 1,778,817 | 10/1930 | Spiro | 60—27 |
| 1,791,523 | 2/1931 | Chaudet | 123—25.21 |
| 2,830,435 | 4/1958 | Mallory | 60—27 |
| 2,839,888 | 6/1958 | Mallory | 60—1 |
| 2,984,067 | 5/1961 | Morris | 60—27 |
| 3,143,850 | 8/1964 | Foster | 60—27 X |
| 3,192,705 | 7/1965 | Miller | 60—27 |
| 3,251,183 | 5/1966 | Whitlow | 60—27 |

FOREIGN PATENTS

| | | |
|---|---|---|
| 191,436 | 11/1907 | Germany. |
| 310,450 | 1/1919 | Germany. |
| 434,287 | 9/1926 | Germany. |
| 617,649 | 9/1935 | Germany. |
| 5,110 | 11/1881 | Great Britain. |
| 7,637 | 4/1908 | Great Britain. |
| 165,263 | 6/1921 | Great Britain. |
| 235,061 | 6/1925 | Great Britain. |

MARTIN P. SCHWADRON, *Primary Examiner.*

R. R. BUNEVICH, *Assistant Examiner.*